Sept. 27, 1960  H. V. MITCHELL  2,954,007
COLLAPSIBLE PET ANIMAL HOUSE
Filed Dec. 31, 1957  2 Sheets-Sheet 1
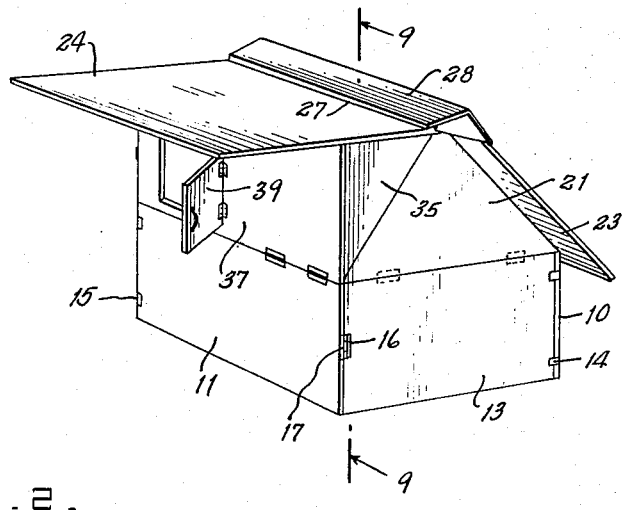
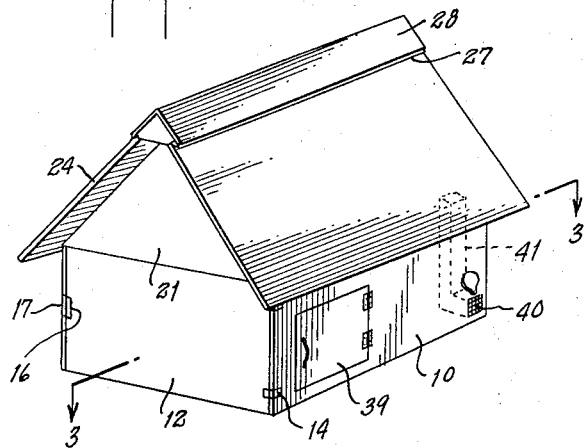
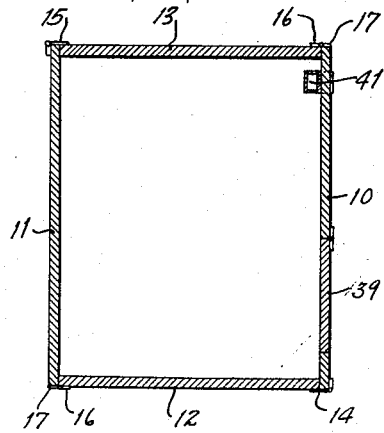
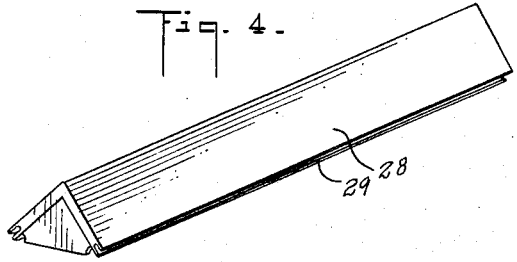
INVENTOR.
HARKLESS V. MITCHELL
BY
ATTORNEYS Sept. 27, 1960     H. V. MITCHELL     2,954,007
COLLAPSIBLE PET ANIMAL HOUSE
Filed Dec. 31, 1957     2 Sheets-Sheet 2
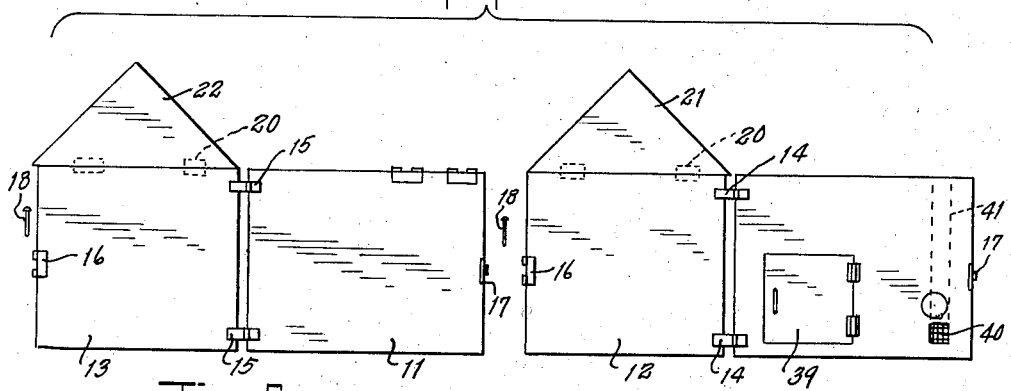
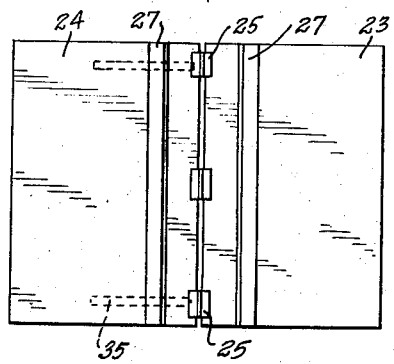
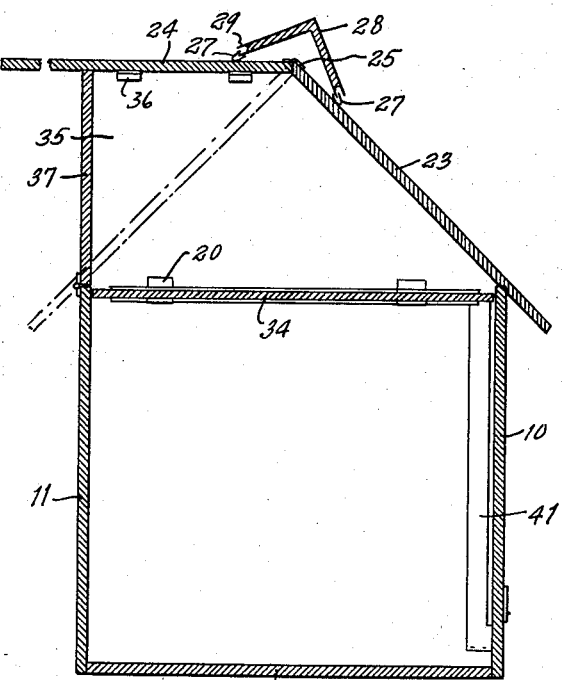
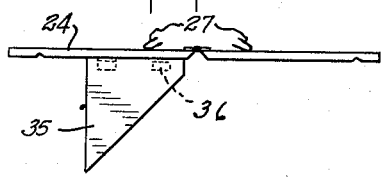
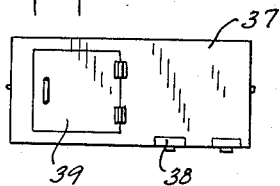
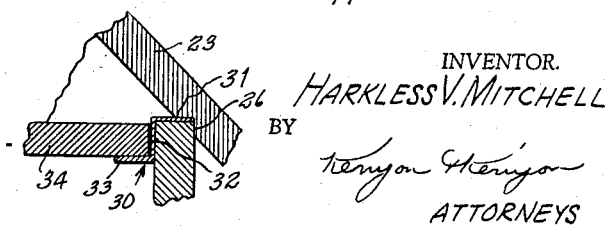
INVENTOR.
HARKLESS V. MITCHELL
BY
ATTORNEYS

United States Patent Office 2,954,007
Patented Sept. 27, 1960

2,954,007

COLLAPSIBLE PET ANIMAL HOUSE

Harkless V. Mitchell, 95 River St., Lake Placid, N.Y.

Filed Dec. 31, 1957, Ser. No. 706,470

3 Claims. (Cl. 119—15)

This invention relates to a portable animal house and more particularly to a collapsible, double compartmented dog house.

Owners of animals, such as dogs, have frequently been confronted with the problem of providing a house for their animals when traveling from one location to another. This burden becomes more acute when traveling with a pair of dogs or a female dog with puppies. To overcome this housing problem, the present invention provides a collapsible animal house which, when folded, is capable of being fitted into a small compact carrying case and eliminates the dilemma of what a person is going to do with his animal when he moves to a new and strange location.

In addition, the present invention is constructed to provide two separate compartments which adequately house more than one animal at a time. The ability to provide two compartments within one housing is particularly advantageous for the owners of female dogs with month old puppies. It has been found that puppies at this age tend to annoy the mother and that the mother must, at times, have a private area.

The primary object of this invention is to provide an animal house which can be dismantled and conveniently folded to fit within a compact carrying case.

Another object of this invention is to provide an animal house which can be readily converted into two separate compartments.

A still further object of this invention is to provide an animal house which embodies a water-proof construction and is provided with adequate ventilation.

A still further object of the invention is to provide an animal house having a sunporch to provide additional resting area for the housed animals.

A still further object of this invention is to provide a light-weight animal house which is simple in construction and inexpensive to manufacture.

With the above in mind, other objects and advantages of the invention will become apparent from the following description taken in conjunction with the drawings in which:

Fig. 1 is a perspective view of the invention showing the rear wall section with the sundeck raised;

Fig. 2 is a perspective view of the invention showing the front wall section;

Fig. 3 is a cross-section view taken along line 3—3 of Fig. 2;

Fig. 4 is a perspective view of the mitered roof section;

Fig. 5 is a side plan view of the four wall sections;

Fig. 6 is a top plan view of the roof section;

Fig. 7 is a side plan view of the roof section;

Fig. 8 is a side plan view of the upper portion of the rear wall section;

Fig. 9 is an enlarged cross-section view taken along line 9—9 of Fig. 1; and

Fig. 10 is a detailed cross-section of the roof and wall connection.

Referring to Figs. 1 and 2, the present invention is shown in detail. It comprises a vertical front wall section 10 and a vertical rear wall section 11. Hinged to the front wall section 10 by strap hinges or the like is a vertical end wall section 12 and hinged to the rear wall section 11 is a vertical side wall section 13. The hinge connection between the front and rear walls and their respective end wall is such that the walls may be folded flat against each other. In this connection it has been found preferable to use a pair of strap hinges affixed the outside corners of the wall as shown at 14 and 15. Centrally affixed to the free ends of said walls which are not connected by said strap hinges are the straps or leaves 16 and 17 of hinges which knuckle together and are adapted to be joined together by removable pin 18. As illustrated in Fig. 5, when the structure is assembled rear wall 11 is joined to end wall 12 and front wall 10 to end wall 13 by means of cooperating leaves 16 and 17 and common pins 18.

The device is provided with a base 19 adapted to hold the bottom edges of walls 10, 11, 12 and 13 when said walls are at right angles to each other and form a rectangle as shown in Fig. 3. It has been found preferable to groove base 19 and provide it with shoulders to accommodate said vertical walls.

The top horizontal edge of end walls 12 and 13 are provided with upwardly extending triangular gable sections 21 and 22. These gable sections are connected to the end wall sections by butt hinges affixed at the inside between the junction of said sections. The gable sections 21 and 22 may be pivoted to a vertical position whereby the base of said gable triangles cooperates with the top edge of said end walls to form continuous end wall sections.

A roof comprising front 23 and rear 24 rectangular sections suitably hinged together on their top side by butt hinges 25 or the like. It has been found preferable to provide three equally spaced butt hinges which may be protected by longitudinal weather-proofing strips. The rectangular roof sections 23 are constructed to extend transversely and longitudinally over the front and rear and end wall sections. As shown in Fig. 2, the roof overlaps the structure on all sides and adequately protects the exterior housing walls.

To maintain the roof in its proper fixed position, longitudinal angular grooves 26 are removed from the underside of said rectangular roof sections which cooperate with the upper extending vertical edges of the front and rear walls. Fig. 10 shows in detail a preferred fitting between said sections. This fitting provides the necessary stability between parts but still permits removability and compactness.

Longitudinally affixed to the upper side on each of said rectangular roof sections is an angled inwardly facing U-shaped metal strip 27. Said strip is located close to the edges of said roof sections joined by hinges 25 and is attached by screw or weld connections. An inverted V-shaped trough 28 having grooves 29 within its exposing ends cooperates with said metal strips whereby said grooves are interlocked with the outward arm of said strip. The inverted V-shaped trough provides a water-proof covering over the connection between the two horizontal roof connections and prohibits leaks through the top of the roof. It should be noted that the connection between the grooved ends 29 of the trough 28 and the arms of metal strip 27 is sufficiently flexible to permit tipping or rotating of one of the rectangular roof sections without destroying the water protecting function of the trough.

To provide a second independent compartment to the before described housing, a right angled Z-shaped supporting flange 30 is attached to the upwardly extending ends of the vertical front and rear walls. The upper horizontal arm 31 of flange 30 rests on the top of said walls while the vertical arm 32 is adjacent the inside of said walls. The lower horizontal arm 33 protrudes inwardly and provides a resting surface for a second elevated base 34. Base 34 is rectangular in shape and fits within the vertical front, rear and end walls. To increase the area of the second compartment beyond that surrounded by the end gables 21 and 22, and the roof sections 23 and 24, a swingable triangular section 35 is hinged 36 near the side edges of the rear roof section 24.

It has previously been described that the rear roof section 24 pivots around hinges 25 and may, therefore, be rotated toward a more horizontal position. When the rear roof section is rotated upwardly in this manner the attached triangular sections 35 swing to a vertical plane and become aligned with the gabled ends 21 and 22. An upward extension 37 of the rear wall section 11 is provided and cooperates with the ends of the triangular sections 35 hinged to the rear roof section 24. The upper rear wall section 37 may be either a removable section having loose joint hinges 38 connecting it to the lower rear wall section 11, or pivotally affixed said rear wall by butt hinges whereby said section may fold inwardly against the rear wall.

Both the front and upper rear wall sections are provided with suitable openings 39 for the passage of animals and may be provided with swingable doors or the like and cooperating locking means.

To provide adequate ventilation screened air openings 40 or the like may be cut within the house and suitably located therein. Likewise, air shafts 41 to remove foul air or increase circulation may be attached to the inside compartments of the housing.

It can readily be realized from the foregoing that all parts of the structure may be folded to fit within a suitable carrying case. To assemble the house the base is placed on the ground with the groove side up. The front and end wall sections are right angled and inserted within the base grooves. The knuckles of the connecting section hinges are mated and the hinge pin inserted. The gabled roof sections are pivoted to the vertical position. The Z-shaped supporting flanges are inserted over the front and rear wall and the second floor base placed on the inwardly extending section of the flange. The roof is unfolded and anchored on the front and rear wall sections. The rear section of the roof is lifted permitting the triangular shaped sides to unfold therefrom, and align themselves with the end gable sections. The upper rear section is added to the rear wall section thus providing the second compartment. And the final operation in assembling the house is to place the inverted V-shaped trough within the accommodating angled U-shaped metal strips.

Although one embodiment of this invention has been shown and described herein, it is understood that certain changes and additions can be made without departing from the spirit and scope of this invention.

I claim:

1. A collapsible animal house comprising a rectangular base, the top of said base having a groove about its periphery, a front wall section, an end wall section hinged to said front wall section along its vertical axis, a rear wall section, an end wall section hinged to said rear wall section along its vertical axis, the bottom edges of said front, rear and end wall sections fitting in the groove in said base, hinge means having a removable pin affixed the ends of said walls whereby said walls may be joined to form a rectangle, end gable sections pivotally hinged to the top edge of said end wall sections, angle means having an inwardly extending flange affixed the top edge of said front and rear wall sections, a second base, said second base fitting within said front, rear and end wall sections and on said inwardly extending flange, a roof member, said member having a front section and rear section longitudinally hinged together, said roof member projecting over said front, rear and gable end sections, said front and rear roof sections provided with an angular longitudinal groove near the edges thereof, said longitudinal groove cooperating with the top edge of said front and rear wall sections whereby said roof member is held by said walls, triangular end wall sections transversely hinged near the edge of said rear roof section, said triangular end wall sections integrating with said gable sections when said rear roof section is pivoted upwardly, an upper rear wall section hinged to the top edge of said rear wall, said upper rear wall section fitting below said rear roof section when said section is pivoted upwardly, an inverted V-shaped trough, U-shaped strip members longitudinally affixed the top of said front and rear roof sections near said connecting hinges, said inverted V-shaped member fitting within said U-shaped strips over said roof connection, door means in said front and upper rear wall sections.

2. A collapsible animal house having two compartments comprising a rectangular base having a groove around its periphery, a front wall section having an end gable section hinged thereto, a rear wall section having a gabled end wall section affixed thereto, said wall sections fitting in said base groove, a roof member having a front section and a rear section, hinge means connecting said sections along the longitudinal axis, said sections in contact with said front and rear walls and said end gable sections, said rear roof section having hinged triangular end wall sections, said triangular end wall sections in contact with said end gable sections when said rear roof section is pivoted upwardly, a second base spaced above said first base and affixed to said front, rear and side walls, apertures in said front wall.

3. A collapsible animal house having two compartments, the first compartment comprising a rectangular base, the top of said base having a groove about its periphery, a front wall section, an end wall section hinged to said front wall section along its vertical axis, a rear wall section, an end wall section hinged to said rear wall section along its vertical axis, the bottom edges of said front, rear and end wall sections fitting in the groove in said base, hinge means having a removable pin affixed the ends of said walls whereby said walls may be joined to form a rectangle, the second compartment comprising a base, holding means affixed the top edge of said front and rear wall sections whereby said base of said second compartment is spaced above said base of said first compartment, gable end sections pivotally hinged to the top edge of said end wall sections, an upper rear wall section hinged to the top edge of said rear wall, a roof member, said member having a front section and a rear section, hinge means affixed said roof sections whereby said roof member may be pivoted about said hinges, triangular end wall sections transversely hinged near the edge of said rear roof section, said triangular end wall sections aligned with said gable sections when said roof is pivoted upwardly at said hinges, waterproofing means provided at said roof pivot hinges and door means in said wall sections whereby animals may enter said housing.

References Cited in the file of this patent

UNITED STATES PATENTS

| | | |
|---|---|---|
| 1,576,330 | Kamerer | Mar. 9, 1926 |
| 2,062,972 | Gertz | Dec. 1, 1936 |
| 2,445,055 | Capaul | July 13, 1948 |